Patented Aug. 16, 1932

1,872,183

UNITED STATES PATENT OFFICE

PERCY W. PORTER, OF WILMINGTON, AND RUSSELL E. NEEDHAM, OF LOS ANGELES, CALIFORNIA

PROCESS FOR MAKING COLLOIDAL SILICA

No Drawing. Application filed November 10, 1930. Serial No. 494,698.

This invention relates to a process for making colloidal silica, otherwise known as silica gel, by a new and novel method.

Colloidal silica or silica gel has been made for many years and its adsorptive properties are well known.

Heretofore the common method of producing colloidal silica or silica gel includes the addition of a solution of sodium silicate to a solution of hydrochloric acid. Great care must be exercised in uniting these solutions, a vigorous stirring being necessary at the moment of mixing to prevent coagulation. A liquid solution of colloidal silicic acid results, which upon standing, sets to a solid mass of firm jelly. After washing and drying, this jelly becomes a hard porous glassy granular substance which is essentially silica $SiO_2$) containing from 5% to 15% water together with a small amount of sodium chloride which is impracticable to wash out. The colloidal silica or silica gel produced as above described has numerous ultra-microscopic pores which have an internal volume of about 0.41 c. c. per gram of silica.

The presence of alkali metal salts in colloidal silica causes an ecceleration of the crystallization of the silica upon heating. The absence of alkali metal salts renders colloidal silica resistant to a greater amount of heat, a valuable factor in re-activating the colloidal silica after having been used to adsorb impurities from petroleum products.

The primary object of this invention is to provide a process for producing a colloidal silica or silica gel which has a more fully developed pore structure and consequently possesses greater adsorptive powers than that produced by the method described above.

A further object is to provide a process which produces a colloidal silica free from metal alkali salts, such as sodium chloride, in consequence of which it has the property of resisting a greater amount of heat, without injury, and may be re-activated for repeated use oftener than products of present methods.

In this invention, instead of a liquid solution of sodium silicate, a solid solution of meta-silicic acid is treated with a solution of hydrochloric acid. This material is furnished in the mineral laumontite, a dry natural silicate, having the composition of $CaO$, $Al_2O_3$, $4SiO_2$, $4H_2O$. That this mineral is a solid solution of meta-silicic acid is demonstrated as follows. Laumontite composition may be regarded as being $CaO$, $Al_2O_3$, $4H_2SiO_3$; if the water and silica are combined. From a large number of tests it has been proven that the only action of the hydrochloric acid is to combine with the calcium and aluminum oxides thereby releasing the meta-silicic acid ($H_2SiO_3$) which combines with water to form ortho-silicic acid ($H_4SiO_4$). It has also been shown, from tests, that one pound of ortho-silicic acid (together with unassociated water) occupies a space of about 5860 c. c. This space determines the volume of acid solution to be used. Using these factors, the chemical reaction is shown as follows.

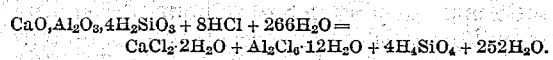
$CaO,Al_2O_3,4H_2SiO_3 + 8HCl + 266H_2O =$
$CaCl_2 \cdot 2H_2O + Al_2Cl_6 \cdot 12H_2O + 4H_4SiO_4 + 252H_2O.$ Calculating on the basis of one pound of pure laumontite requires a volume of hydrochloric acid solution of 4800 ml. having a specific gravity of 1.0286 with a concentration of HCl gas 5.70% yielding 0.82 of a pound of ortho-silicic acid or 0.51 of a pound of dry colloidal silica ($SiO_2$). These quantities very closely agree with tests.

The mineral laumontite was selected from a number of other minerals on account of its high percentage of silica, the absence of alkali metal salts, the absence of heavy metal salts, the low per cent of HCl gas required to liberate the ortho-silicic acid and the discovery of a commercial deposit of rock carrying up to 35% of laumontite.

It has been known for many years that from laumontite a jelly of silicic acid could be obtained by using a hot concentrated solution of hydrochloric acid and partially evaporating the solution. The fact that a jelly of silicic acid can be produced from laumontite by the use of a dilute solution of hydrochloric acid without the application of heat, without evaporation and that this jelly of silicic acid when properly dried and washed has great adsorptive powers, is new.

The method of procedure is as follows: Start with a vessel of unit size, say one liter. Use 900 ml. of acid solution which from the above reaction would require 144.54 ml. of commercial hydrochloric acid Bé. 20°, specific gravity 1.16 with a concentration of 31.45% of HCl gas and 755.46 ml. water. A small excess of acid is used to take care of soluble impurities. For example use 150 ml. HCl Bé. 20° and 750 ml. water. This volume would require 0.1875 of a pound of pure laumontite but if the rock carries only 25% of laumontite then 0.75 of a pound of mixture would be required. The mixture of rock and laumontite is ground to 200 mesh fineness and mixed with the acid solution.

No particular skill is required in mixing other than a slight stirring to insure the dry powder to be thoroughly moistened. There is no danger of coagulation of the silicic acid. No application of heat is necessary although it has been found that by heating the acid to about 40° C. increases the output somewhat. The final mixture to which no heat has been applied, develops a slight rise in temperature sufficient to be noticed when the hand is placed on the side of the vessel. The insoluble portion of the powder is allowed to settle, the liquid loses its excess heat in a few minutes and becomes opalescent. The reaction is now complete and the supernatant liquid colloidal solution is decanted into a sufficient number of trays so that the liquid is about one inch deep and allowed to stand.

This colloidal solution will set to a firm solid mass of jelly in 8 to 24 hours depending upon how closely the percentage of laumontite in the rock has been calculated. The formation of this jelly, which is ortho-silicic acid, does not depend upon evaporation, in fact it has been observed that the jelly starts to form at the bottom of the vessel and gradually proceeds upward. The jelly is not disturbed, but is left in the trays and placed in the direct rays of the sun in a location open to the natural breezes to dry. The best quality of colloidal silica is produced by slow drying of the jelly. If possible this drying is done in an atmosphere of low relative humidity such as occurs in the arid regions of Southern California. If such an atmosphere is not available a drying room may be prepared to simulate such atmosphere. The jelly is dried until the calcium and aluminum chlorides have crystallized, which requires from 3 to 6 days. The crystallization of these chlorides develops the pore structure to the fullest extent.

The dry colloidal silica (still in the trays) is now washed free of chlorides and again subjected to the drying process until the colloidal silica has a dry external appearance. The pores of the colloidal silica are now full of water, the condition which exists after use in adsorbing moisture from a gas or liquid. The colloidal silica is removed to a suitable re-activating furnace and the water may be removed by heating to 750° C., if desired, without loss or injury to the colloidal silica. The colloidal silica after heating to 750° C. now has a water content of less than 2% of the weight of the dry colloidal silica. The less water remaining, the greater will be the adsorptive powers of the colloidal silica. The colloidal silica produced by the foregoing described method is a hard, glassy, granular transparent, highly porous substance consisting essentially of silica ($SiO_2$) in an amorphous or colloidal condition.

The internal pore space in this colloidal silica is more than 0.47 c. c. per gram. Its chemical and physical stability is so great that it may be repeatedly re-activated and used many times.

Comparative tests were made upon four different adsorptive materials under parallel conditions of degree of fineness, temperature etc. Petroleum refinery residuum was diluted with gasoline to a dark cherry color just visible through a test tube ¾ inch in diameter. Small quantities were added to the adsorptive materials until they were saturated with coloring impurities and the liquid rendered water white. Results were as follows:

|  | Grams cleaned | Milligrams | #/gal. |
|---|---|---|---|
| Colloidal silica (this invention) | 60 | 119 | 4.20 |
| Silica gel (other processes) | 60 | 90 | 5.52 |
| Acid treated clay | 60 | 86 | 5.85 |
| Fuller's earth | 60 | 80 | 6.33 |

Considering colloidal silica as having 100% efficiency, the other materials have efficiencies of 76%, 72% and 67% respectively.

Claims:

1. The process of making colloidal silica, or silica gel, which comprises the mixing of finely ground mineral laumontite with dilute hydrochloric acid, without the application of heat, by slightly stirring the former into the latter, allowing the mixture to settle, decanting the supernatant solution into shallow trays, allowing it to stand therein until it solidifies and causing it to dry slowly in drying rooms or in the direct rays of the sun.

2. The process of making colloidal silica, or silica gel, which comprises the mixing of finely ground mineral laumontite with dilute hydrochloric acid, without the application of heat, by slightly stirring the former into the latter, allowing the mixture to settle, decanting the supernatant solution into shallow trays, allowing it to stand therein until it solidifies, slowly drying the solidified contents of the trays, treating it with water to dissolve and remove the chlorides which have become crystallized therein, re-drying said solidified contents of the trays, and finally, expelling all but a trace of the water from the pores thereof by subjecting them to the action of a re-activating furnace.

3. The process of making an exceptionally porous and heat-resisting colloidal silica, or silica gel, which comprises the stirring of pulverized mineral laumontite into a dilute solution of hydrochloric acid, at normal temperature, allowing the mixture to stand until the undissolved mineral has settled, decanting the supernatant solution into shallow trays, allowing it to stand therein until it has become a solidified gel, exposing the gel contained in said trays to the direct rays of the sun or slowly drying it in a drying-room, washing the crystallized chlorides out of the pores of said gel, re-drying said gel and, finally, expelling all but a trace of the water from the pores thereof by subjecting said solidified gel to a heat of approximately 750° C. in a re-activating furnace.

4. The process of making colloidal silica, or silica gel, which comprises the mixing of mineral laumontite with dilute hydrochloric acid, without the application of heat, allowing the mixture to settle, decanting the supernatant solution, allowing it to stand after decanting until it solidifies, and then causing it to dry.

In testimony whereof, we hereunto affix our signatures.

PERCY W. PORTER.
RUSSELL E. NEEDHAM.